(12) United States Patent
Ehara et al.

(10) Patent No.: US 12,237,463 B2
(45) Date of Patent: *Feb. 25, 2025

(54) SEALED BATTERY AND ASSEMBLED BATTERY

(71) Applicant: TOYOTA JIDOSHA KABUSHIKI KAISHA, Toyota (JP)

(72) Inventors: Tsuyoshi Ehara, Toyota (JP); Yoshinori Shibata, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/611,976

(22) Filed: Mar. 21, 2024

(65) Prior Publication Data

US 2024/0234795 A1    Jul. 11, 2024

Related U.S. Application Data

(60) Continuation of application No. 18/398,445, filed on Dec. 28, 2023, which is a division of application No.
(Continued)

(30) Foreign Application Priority Data

Feb. 28, 2019  (JP) ................................. 2019-036413

(51) Int. Cl.
*H01M 10/0525*   (2010.01)
*H01M 50/209*    (2021.01)
(Continued)

(52) U.S. Cl.
CPC ..... *H01M 10/0525* (2013.01); *H01M 50/209* (2021.01); *H01M 50/503* (2021.01);
(Continued)

(58) Field of Classification Search
None
See application file for complete search history.

(56) References Cited

U.S. PATENT DOCUMENTS

2001/0049054 A1* 12/2001 Enomoto ............ H01M 50/566
429/177
2013/0061987 A1*  3/2013 Prevond ................ B32B 15/016
148/285
(Continued)

FOREIGN PATENT DOCUMENTS

CN    107887530 A    4/2018
CN    107919493 A    4/2018
(Continued)

OTHER PUBLICATIONS

Tsuyoshi Ehara et al., U.S. Appl. No. 16/790,977, Restriction Requirement dated Apr. 15, 2022.
(Continued)

*Primary Examiner* — Lisa S Park
(74) *Attorney, Agent, or Firm* — Dickinson Wright, PLLC (57) ABSTRACT

The present disclosure provides a joining technique capable of improving strength and reducing electrical resistance of a connecting portion that performs heterometal interjunction in a sealed battery. A mode of the sealed battery disclosed herein includes an electrode body, a battery case, a positive electrode internal terminal, a positive electrode external terminal, a negative electrode internal terminal, and a negative electrode external terminal. In the sealed battery, in a connecting portion between the negative electrode internal terminal and the negative electrode external terminal, an upper end of the negative electrode internal terminal and the negative electrode external terminal are stacked with a plated layer interposed therebetween and, at the same time, the negative electrode internal terminal and the negative electrode external terminal are joined to each other via the
(Continued)

plated layer. In addition, a rough surface having a plurality of recessed portions is formed on the upper surface of the negative electrode external terminal having been stacked with the plated layer interposed therebetween, and a part of the plated layer penetrates into the recessed portions. Accordingly, a connecting portion having high strength and low resistance can be formed between the negative electrode internal terminal and the negative electrode external terminal.

3 Claims, 4 Drawing Sheets

Related U.S. Application Data

16/790,977, filed on Feb. 14, 2020, now Pat. No. 11,908,991.

(51) Int. Cl.
- *H01M 50/503* (2021.01)
- *H01M 50/522* (2021.01)
- *H01M 50/534* (2021.01)
- *H01M 50/536* (2021.01)
- *H01M 50/55* (2021.01)
- *H01M 50/553* (2021.01)
- *H01M 50/562* (2021.01)

(52) U.S. Cl.
CPC ....... *H01M 50/522* (2021.01); *H01M 50/534* (2021.01); *H01M 50/536* (2021.01); *H01M 50/55* (2021.01); *H01M 50/553* (2021.01); *H01M 50/562* (2021.01); *H01M 2220/20* (2013.01)

(56) References Cited

U.S. PATENT DOCUMENTS

| | | | |
|---|---|---|---|
| 2015/0214516 A1* | 7/2015 | Jang | H01M 50/505 |
| | | | 429/181 |
| 2018/0026252 A1 | 1/2018 | Kumazawa et al. | |
| 2018/0097258 A1 | 4/2018 | Ono | |
| 2021/0376431 A1* | 12/2021 | Enomoto | H01M 50/562 |

FOREIGN PATENT DOCUMENTS

| | | | |
|---|---|---|---|
| EP | 3279968 A1 | | 2/2018 |
| JP | 2014179193 | * | 9/2014 |
| JP | 2014179193 A | | 9/2014 |
| JP | 2016162590 A | | 9/2016 |
| JP | 2018-12125 A | | 1/2018 |
| JP | 2018055892 A | | 4/2018 |
| WO | 2016084488 A1 | | 6/2016 |

OTHER PUBLICATIONS

Tsuyoshi Ehara et al., U.S. Appl. No. 16/790,977, Non-Final Office Action dated Jul. 14, 2022.

Tsuyoshi Ehara et al., U.S. Appl. No. 16/790,977, Final Office Action dated Jan. 13, 2023.

Tsuyoshi Ehara et al., U.S. Appl. No. 16/790,977, Non-Final Office Action dated Apr. 7, 2023.

Tsuyoshi Ehara et al., U.S. Appl. No. 16/790,977, Final Office Action dated Jul. 19, 2023.

Tsuyoshi Ehara et al., U.S. Appl. No. 16/790,977, Notice of Allowance dated Oct. 23, 2023.

Tsuyoshi Ehara et al. U.S. Appl. No. 18/398,445, filed Dec. 28, 2023.

* cited by examiner

SEALED BATTERY AND ASSEMBLED BATTERY

CROSS REFERENCE TO RELATED APPLICATIONS

The present application is a continuation of U.S. patent application Ser. No. 18/398,445, filed Dec. 28, 2023, which is a divisional of U.S. patent application Ser. No. 16/790,977, filed Feb. 14, 2020, which claims the benefit of foreign priority to Japanese Patent Application No. 2019-36413 filed Feb. 28, 2019, which is herein incorporated by reference in its entirety.

BACKGROUND

1. Technical Field

The present disclosure is related to a sealed battery and an assembled battery. Specifically, the present disclosure is related to a sealed battery, a method of manufacturing the sealed battery, an assembled battery including a plurality of unit cells, and a method of manufacturing the assembled battery.

2. Description of the Related Art

Lithium ion secondary batteries and other nonaqueous electrolyte secondary batteries are growing in importance as vehicle-mounted power supplies and as power supplies for personal computers, mobile phones, and the like. In particular, lithium ion secondary batteries being lightweight and capable of attaining high energy density are preferably used as high-output vehicle-mounted power supplies. A secondary battery of this type is constructed as, for example, a sealed battery in which an electrode body is housed inside a battery case. The sealed battery includes an internal terminal which is connected to the electrode body inside the battery case and of which a part is exposed to outside of the battery case and an external terminal which is connected outside of the battery case to the internal terminal. In addition, when constructing an assembled battery which includes the sealed battery in plurality as unit cells, external terminals of unit cells arranged adjacent to each other are connected via a busbar.

In the field of the batteries described above, a joining technique such as laser welding is used when forming connecting portions between metal members such as a connecting portion between an internal terminal and an external terminal and a connecting portion between the external terminal and a busbar. In addition, in connecting portions between metal members in the field of batteries, two types of metal members respectively constituted by different materials may be joined. Japanese Patent Application Publication No. 2018-12125 discloses an example of a technique that uses laser welding or the like for such heterometal interjunction. Specifically, the document discloses a technique for setting a ratio of an intermetallic compound including aluminum and copper to 15% or higher and 60% or lower at a welded portion of a first member made of copper and a second member made of aluminum. The document also discloses performing the heterometal interjunction described above between a busbar and an electrode (an external terminal) of a battery.

SUMMARY

However, in recent years, there is a growing demand for endurance and battery performance with respect to sealed batteries and assembled batteries, and a need exists to develop a new joining technique that enables a preferable connecting portion with high junction strength and low electrical resistance to be formed in heterometal interjunction.

The present disclosure has been made in consideration of this need and a main object thereof is to provide a technique capable of improving strength and reducing electrical resistance of a portion that performs heterometal interjunction in a sealed battery or an assembled battery.

A sealed battery disclosed herein includes: an electrode body having a positive electrode and a negative electrode; a battery case housing the electrode body; a positive electrode-side internal terminal which is connected inside the battery case to the positive electrode and of which a part is exposed to outside of the battery case; a positive electrode-side external terminal which is connected outside the battery case to the positive electrode-side internal terminal; a negative electrode-side internal terminal which is connected inside the battery case to the negative electrode and of which a part is exposed to outside of the battery case; and a negative electrode-side external terminal which is connected outside the battery case to the negative electrode-side internal terminal. In addition, in the sealed battery disclosed herein, the internal terminal and the external terminal of at least one of the positive electrode side and the negative electrode side are constituted by metal materials that differ from each other, and at a connecting portion between the internal terminal and the external terminal, a part of the internal terminal and a part of the external terminal are stacked with a plated layer interposed therebetween and, at the same time, the internal terminal and the external terminal are joined to each other via the plated layer. Furthermore, a rough surface having a plurality of recessed portions is formed on at least one of a surface of the internal terminal and a surface of the external terminal having been stacked with the plated layer interposed therebetween, and a part of the plated layer penetrates into the recessed portions.

The present inventors carried out various experiments and studies in order to achieve the object described above. As a result, the present inventors arrived at the idea of applying a new joining technique utilizing a plated layer to a junction between an internal terminal and an external terminal of a sealed battery. Specifically, in the sealed battery disclosed herein, the internal terminal and the external terminal are joined to each other by forming a plurality of recessed portions in at least one of the internal terminal and the external terminal and forming a plated layer so that a part of the plated layer penetrates into the recessed portions. An anchor effect can be generated by causing a part of the plated layer to penetrate into recessed portions of a connection object in this manner. As a result, a robust connecting portion having superior strength can be formed without being affected by a difference between respective metal materials of the internal terminal and the external terminal. In addition, according to the sealed battery disclosed herein, since the internal terminal and the external terminal are connected to each other via the plated layer with superior conductivity, a connecting portion with low electrical resistance can be formed.

In addition, according to a preferable aspect of the sealed battery disclosed herein, the negative electrode-side internal terminal is constituted by a metal material of which a main component is Cu and, at the same time, the negative electrode-side external terminal is constituted by a metal material of which a main component is Al. Furthermore, an alumite layer is formed on a surface in contact with the plated layer of the negative electrode-side external terminal, and the plurality of recessed portions are micropores formed in the alumite layer.

When forming a plurality of recessed portions on surfaces of the internal terminal and the external terminal, anodization is preferably used. An anodized film (an alumite layer) formed by the anodization has submicron micropores on a surface thereof. By causing a part of the plated layer to penetrate into the micropores, an anchor effect can be generated in a preferable manner and a connecting portion having more superior strength can be formed.

In addition, in a preferable aspect of the sealed battery disclosed herein, the plated layer includes at least one selected from a group consisting of Ag, Au, Zn, Ni, Cu, Pt, and alloys including these metal elements.

For the plated layer, a metal material that can be used in a general plating process can be used without any particular restrictions. A plated layer formed by the metal materials described above among such metal materials is preferable by virtue of high strength and superior conductivity.

Furthermore, as another aspect of the present disclosure, an assembled battery including a plurality of unit cells is provided. The assembled battery disclosed herein includes a plurality of unit cells having an external terminal arranged outside of a battery case and a busbar which connects the external terminal of one unit cell and the external terminal of another unit cell to each other. The plurality of unit cells in the assembled battery further include an electrode body housed inside the battery case and an internal terminal which is connected inside the battery case to the electrode body and of which a part is connected outside the battery case to the external terminal. In addition, in the assembled battery disclosed herein, at a connecting portion between two metal members which are present on a conductive path from the internal terminal of one unit cell to the internal terminal of another unit cell and which are constituted by metal materials that differ from one another via the external terminal and the busbar, a part of one metal member and a part of another metal member are stacked with a plated layer interposed therebetween and, at the same time, the one metal member and the other metal member are joined to each other via the plated layer. Furthermore, a rough surface having a plurality of recessed portions is formed on at least one of a surface of the one metal member and a surface of the other metal member having been stacked with the plated layer interposed therebetween, and a part of the plated layer penetrates into the recessed portions.

Because the heterometal interjunction may be performed even when constructing an assembled battery, a joining technique utilizing the plated layer described above can also be applied to the formation of a connecting portion between metal members in an assembled battery. Specifically, in an assembled battery including a plurality of unit cells, a conductive path from an internal terminal of one unit cell to an internal terminal of another unit cell is formed via an external terminal and a busbar. In addition, various connecting portions may be formed in plurality along the conductive path. Applying the joining technique utilizing the plated layer described above to the heterometal interjunction, a high-performance assembled battery having a conductive path with high strength and low resistance can be obtained without being affected by a difference between respective metal materials of the internal terminal and the external terminal.

Furthermore, according to a preferable aspect of the assembled battery disclosed herein, the one metal member is an external terminal constituted by a metal material of which a main component is Cu and, at the same time, the other metal member is a busbar constituted by a metal material of which a main component is Al. In addition, an alumite layer is formed on a surface in contact with the plated layer of the busbar, and the plurality of recessed portions are micropores formed in the alumite layer.

In the assembled battery disclosed herein, an anodized film (an alumite layer) having micropores is formed on the busbar and a plated layer is caused to penetrate into the micropores. Accordingly, since an anchor effect can be generated in a preferable manner, a connecting portion having more superior strength can be formed.

In addition, a method of manufacturing a sealed battery is provided as another aspect of the present disclosure. The manufacturing method provides a sealed battery including: an electrode body having a positive electrode and a negative electrode; a battery case housing the electrode body; a positive electrode-side internal terminal which is connected inside the battery case to the positive electrode and of which a part is exposed to outside of the battery case; a positive electrode-side external terminal which is connected outside the battery case to the positive electrode-side internal terminal; a negative electrode-side internal terminal which is connected inside the battery case to the negative electrode and of which a part is exposed to outside of the battery case; and a negative electrode-side external terminal which is connected outside the battery case to the negative electrode-side internal terminal, wherein the internal terminal and the external terminal of at least one of the positive electrode side and the negative electrode side are constituted by metal materials that differ from each other. The manufacturing method includes a step of connecting an internal terminal and an external terminal to each other. In addition, the step of connecting an internal terminal and an external terminal constituted by metal materials that differ from each other includes: a rough surface forming step of forming a rough surface having a plurality of recessed portions on at least one of a surface of the internal terminal and a surface of the external terminal; and a plating-joining step of arranging the internal terminal and the external terminal so that the rough surface faces another connection object, forming a plated layer between the internal terminal and the external terminal, and joining the internal terminal and the external terminal to each other by causing a part of the plated layer to penetrate into the recessed portions.

In the manufacturing method disclosed herein, a part of the plated layer is caused to penetrate into a plurality of recessed portions formed on at least one of the internal terminal and the external terminal. Accordingly, a connecting portion having superior strength can be formed without being affected by a difference between respective metal materials of the internal terminal and the external terminal. In addition, since the internal terminal and the external terminal are connected to each other via the plated layer with superior conductivity, a connecting portion with low electrical resistance can be formed.

In addition, in a preferable aspect of the method of manufacturing a sealed battery disclosed herein, in the rough surface forming step, by performing anodization on a surface of the negative electrode-side external terminal constituted by a metal material of which a main component is Al, an alumite layer having a plurality of micropores is formed on the surface of the external terminal.

As described above, performing anodization enables an anodized film (an alumite layer) having a plurality of micropores to be formed. Accordingly, an anchor effect can be generated in a preferable manner and a connecting portion having more superior strength can be formed.

Furthermore, a method of manufacturing an assembled battery is provided as another aspect of the present disclosure. The method of manufacturing an assembled battery disclosed herein manufactures an assembled battery including a plurality of unit cells having an external terminal arranged outside of a battery case and a busbar which connects the external terminal of one unit cell and the external terminal of another unit cell to each other. The plurality of unit cells in the assembled battery further include an electrode body housed inside the battery case and an internal terminal which is connected inside the battery case to the electrode body and of which a part is connected outside the battery case to the external terminal. In addition, the method of manufacturing an assembled battery disclosed herein includes a step of connecting two metal members which are present on a conductive path from the internal terminal of one unit cell to the internal terminal of another unit cell and which are constituted by metal materials that differ from one another via the external terminal and the busbar. Furthermore, the step includes: a rough surface forming step of forming a rough surface having a plurality of recessed portions on at least one of a surface of the one metal member and a surface of the other metal member; and a plating-joining step of arranging the two metal members so that the rough surface faces another connection object, forming a plated layer between the two metal members, and joining the two metal members to each other by causing a part of the plated layer to penetrate into the recessed portions.

As described above, the joining technique disclosed herein can also be applied when a heterometal interjunction is present on a conductive path that connects unit cells. Accordingly, a high-performance assembled battery having a conductive path with high strength and low resistance can be manufactured without being affected by a difference between respective metal materials of the internal terminal and the external terminal.

In a preferable aspect of the method of manufacturing an assembled battery disclosed herein, the one metal member is an external terminal constituted by a metal material of which a main component is Cu and, at the same time, the other metal member is a busbar constituted by a metal material of which a main component is Al. In addition, the manufacturing method forms, in the rough surface forming step, an alumite layer having a plurality of micropores is formed on a surface of the busbar by performing anodization on the surface of the busbar.

As described above, forming an anodized film (an alumite layer) having a plurality of micropores by anodization enables an anchor effect to be exhibited in a preferable manner. As a result, a connecting portion having more superior strength can be formed.

DETAILED DESCRIPTION

An embodiment of the present disclosure will be described below. It should be noted that, in the following drawings, members and portions that produce the same effects will be described using the same reference characters. It should also be noted that dimensional relationships (a length, a width, a thickness, and the like) shown in the respective drawings do not reflect actual dimensional relationships. Matters required to carry out the present disclosure, with the exception of matters specifically mentioned in the present specification, may be understood to be design matters of a person with ordinary skill in the art based on the prior art in the relevant technical field.

Sealed Battery

1. Structure of Sealed Battery

Figure 1:
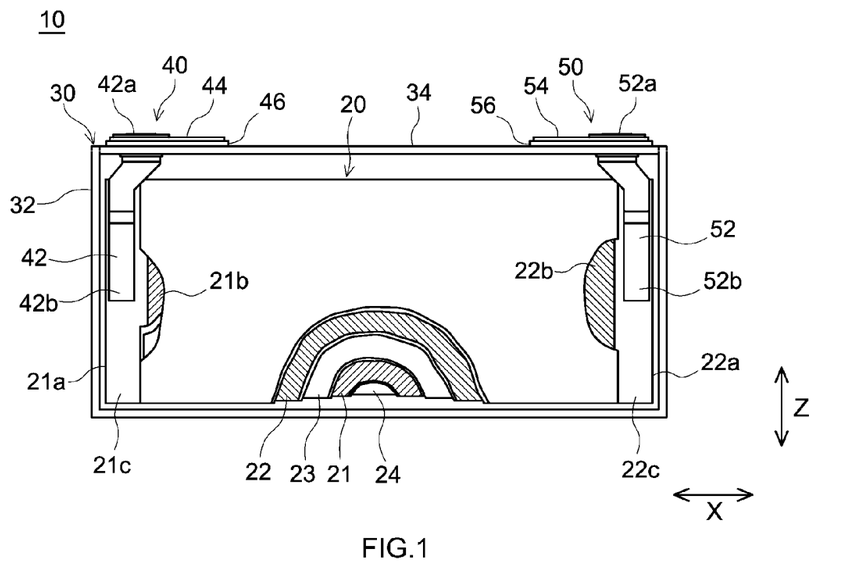
FIG. 1 is a partial sectional view of a sealed battery according to an embodiment of the present disclosure.
Figure 2:
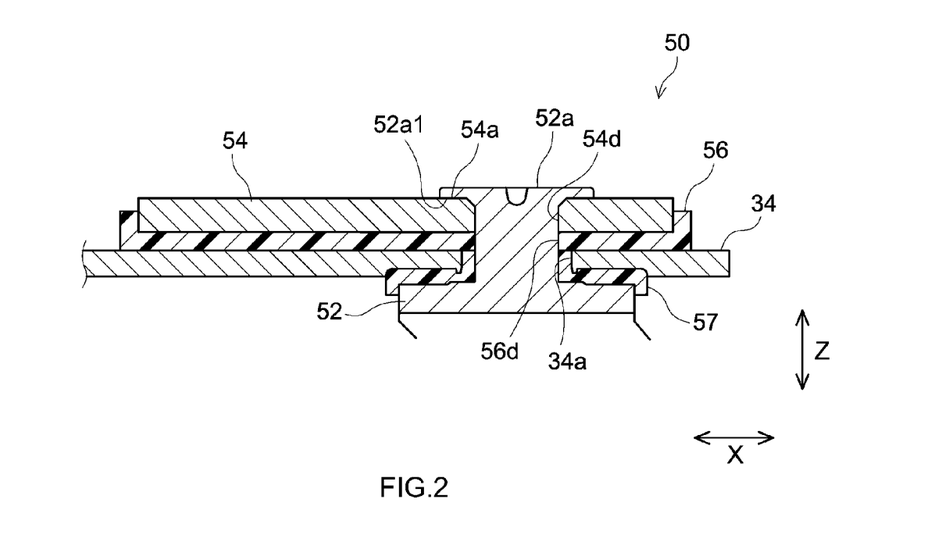
FIG. 2 is a sectional view showing an enlargement of a vicinity of a negative electrode terminal shown in FIG. 1.
Figure 3:
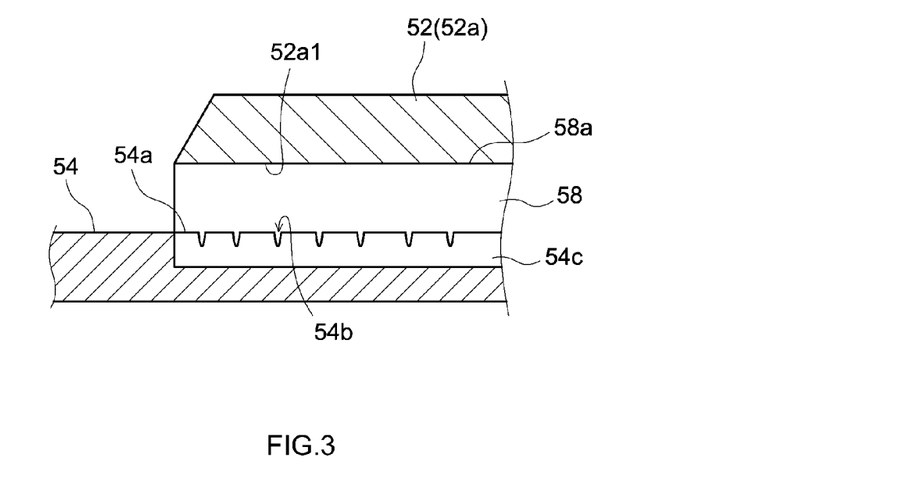
FIG. 3 is a sectional view showing an enlargement of a connecting portion between a negative electrode internal terminal and a negative electrode external terminal shown in FIG. 2.

FIG. 1 is a partial sectional view of a sealed battery according to the present embodiment. In addition, FIG. 2 is a sectional view showing an enlargement of a vicinity of a negative electrode terminal shown in FIG. 1. Furthermore, FIG. 3 is a sectional view showing an enlargement of a connecting portion between a negative electrode internal terminal and a negative electrode external terminal shown in FIG. 2. In the drawings of the present specification, a reference character X denotes a width direction (of a battery), a reference character Y denotes a thickness direction, and a reference character Z denotes a height direction. However, it should be noted that such directions are directions determined for the sake of illustration and are not intended to limit modes of installation of batteries.

As shown in FIG. 1, a sealed battery 10 according to the present embodiment includes an electrode body 20, a battery case 30, a positive electrode terminal 40, and a negative electrode terminal 50. Hereinafter, a structure of each element will be described.

(1) Electrode Body

The electrode body 20 is a power generation element housed inside the battery case 30 in a state of being covered by an insulating film (not illustrated) or the like. The electrode body 20 according to the present embodiment includes an elongated sheet-shaped positive electrode 21, an elongated sheet-shaped negative electrode 22, and elongated sheet-shaped separators 23 and 24. The electrode body 20 is a wound electrode body in which the elongated sheet-shaped members described above are wound in layers. It should be noted that the structure of the electrode body is not particularly limited and various structures that may be adopted in a general sealed battery can be adopted. For example, the electrode body may be a laminated electrode body in which a positive electrode and a negative electrode with rectangular sheet shapes are laminated via a separator.

The positive electrode 21 includes a foil-shaped positive electrode current collector 21*a* (for example, aluminum foil)

and a positive electrode active material layer 21b formed on a surface (preferably, both surfaces) of the positive electrode current collector 21a. In addition, in one side edge portion (a left-side side edge portion in FIG. 1) of the positive electrode 21 in the width direction X, the positive electrode active material layer 21b is not formed but a positive electrode connecting portion 21c is formed in which the positive electrode current collector 21a is exposed. The positive electrode active material layer 21b includes various materials such as a positive electrode active material, a binder, and a conductive material. Regarding the materials included in the positive electrode active material layer 21b, materials that may be used in a conventional general secondary battery (for example, a lithium-ion secondary battery) can be used without any particular limitations and the present disclosure is not limited by such materials. Therefore, in the present specification, a detailed description related to the materials included in the positive electrode active material layer 21b will be omitted.

The negative electrode 22 includes a foil-shaped negative electrode current collector 22a (for example, copper foil) and a negative electrode active material layer 22b formed on a surface (preferably, both surfaces) of the negative electrode current collector 22a. In addition, in another side edge portion (a right-side side edge portion in FIG. 1) of the negative electrode 22 in the width direction X, the negative electrode active material layer 22b is not formed but a negative electrode connecting portion 22c is formed in which the negative electrode current collector 22a is exposed. In a similar manner to the positive electrode active material layer 21b, the negative electrode active material layer 22b also includes various materials such as a negative electrode active material, a binder, and the like. Regarding the materials included in the negative electrode active material layer 22b, materials that may be used in a conventional general secondary battery can be similarly used without any particular limitations and the present disclosure is not limited by such materials. Therefore, a detailed description related to the materials included in the negative electrode active material layer 22b will also be omitted.

The separators 23 and 24 are interposed between the positive electrode 21 and the negative electrode 22 and prevent the electrodes from coming into direct contact with each other. Although not illustrated, micropores are formed in plurality in the separators 23 and 24. Lithium ions move between the positive electrode 21 and the negative electrode 22 through these micropores. A resin sheet or the like having required heat resistance is used as the separators 23 and 24. Since a separator that may be used in a conventional general secondary battery can be used as the separators 23 and 24 without any particular limitations, a detailed description related to the separators 23 and 24 will be omitted.

(2) Battery Case

The battery case 30 is a container which houses the electrode body 20. The battery case 30 according to the present embodiment is a flat square container and includes a square case main body 32 of which an upper surface is opened and a plate-shaped lid 34 which closes an opening portion of the case main body 32. A metal material (such as aluminum, an aluminum alloy, or the like) having required strength may be used as the battery case 30.

(3) Electrode Terminal

The sealed battery 10 according to the present embodiment includes a positive electrode-side electrode terminal (the positive electrode terminal 40) connected to the positive electrode 21 of the electrode body 20 and a negative electrode-side electrode terminal (the negative electrode terminal 50) connected to the negative electrode 22 of the electrode body 20.

The positive electrode terminal 40 includes a positive electrode-side internal terminal (a positive electrode internal terminal 42) and a positive electrode-side external terminal (a positive electrode external terminal 44). The positive electrode internal terminal 42 is an elongated metal member that extends in the height direction Z. A lower end 42b of the positive electrode internal terminal 42 is connected inside the battery case 30 to the positive electrode 21 (specifically, the positive electrode connecting portion 21c). On the other hand, an upper end 42a of the positive electrode internal terminal 42 penetrates the lid 34 and is exposed to the outside of the battery case 30. In addition, the positive electrode external terminal 44 is a plate-shaped metal member that extends in the width direction X. The positive electrode external terminal 44 is connected outside the battery case 30 to the upper end 42a of the positive electrode internal terminal 42. In addition, in the positive electrode terminal 40 according to the present embodiment, in order to prevent conduction between the battery case 30 (the lid 34) and the positive electrode external terminal 44, an insulated holder 46 is arranged between the lid 34 and the positive electrode external terminal 44. In the sealed battery 10 according to the present embodiment, both the positive electrode internal terminal 42 and the positive electrode external terminal 44 are constituted by metal materials having a metal of a same type (for example, aluminum) as a main component.

The negative electrode terminal 50 has a structure that is approximately the same as that of the positive electrode terminal 40 described above. Specifically, the negative electrode terminal 50 includes a negative electrode-side internal terminal (a negative electrode internal terminal 52) and a negative electrode-side external terminal (a negative electrode external terminal 54). The negative electrode internal terminal 52 is an elongated metal member that extends in the height direction Z. A lower end 52b of the negative electrode internal terminal 52 is connected inside the battery case 30 to the negative electrode 22 (specifically, the negative electrode connecting portion 22c). On the other hand, an upper end 52a of the negative electrode internal terminal 52 penetrates the lid 34 and is exposed to the outside of the battery case 30. In addition, the negative electrode external terminal 54 is a plate-shaped metal member that extends in the width direction X. The negative electrode external terminal 54 is connected outside the battery case 30 to the upper end 52a of the negative electrode internal terminal 52. In addition, an insulated holder 56 is arranged between the lid 34 and the negative electrode external terminal 54.

Unlike the positive electrode terminal 40 described above, in the negative electrode terminal 50 according to the present embodiment, the negative electrode internal terminal 52 and the negative electrode external terminal 54 are constituted by metal materials that differ from each other. For example, the negative electrode internal terminal 52 is constituted by a metal material having copper (Cu) as a main component, and the negative electrode external terminal 54 is constituted by a metal material having aluminum (Al) as a main component.

In the sealed battery 10 according to the present embodiment, a plated layer is formed in a connecting portion between the negative electrode internal terminal 52 and the negative electrode external terminal 54 constituted by respectively different metal materials. In addition, the negative electrode internal terminal 52 and the negative electrode external terminal 54 are joined to each other via the plated layer. The connecting portion between the negative electrode internal terminal 52 and the negative electrode external terminal 54 will now be described in specific terms.

As shown in FIG. 2, a terminal insertion hole 34a into which the upper end 52a of the negative electrode internal terminal 52 is to be inserted is formed in the lid 34. A gasket 57 is mounted to the terminal insertion hole 34a of the lid 34. In addition, a terminal insertion hole 54d is also formed at one end of the negative electrode external terminal 54, and a terminal insertion hole 56d is also formed at one end of the insulated holder 56. The insulated holder 56 and the negative electrode external terminal 54 are arranged on an upper surface of the lid 34 so that the terminal insertion holes of the members overlap with each other. Furthermore, the upper end 52a of the negative electrode internal terminal 52 is inserted into the terminal insertion holes of the respective members having been arranged so as to overlap with each other. In addition, the upper end 52a of the negative electrode internal terminal 52 exposed to the outside of the battery case 30 (an upper side of the negative electrode external terminal 54) is pressed and deformed into a disk shape. Accordingly, the negative electrode internal terminal 52, the negative electrode external terminal 54, and the insulated holder 56 are fixed to the lid 34.

In addition, as shown in FIG. 3, in the sealed battery 10 according to the present embodiment, a plated layer 58 including copper (Cu) as a main component is formed between a lower surface 52a1 of the upper end 52a of the negative electrode internal terminal 52 and an upper surface 54a of the negative electrode external terminal 54. In other words, in the sealed battery 10 according to the present embodiment, at the connecting portion between the negative electrode internal terminal 52 and the negative electrode external terminal 54, the upper end 52a of the negative electrode internal terminal 52 and a peripheral edge portion (refer to FIG. 2) of the terminal insertion hole 54d of the negative electrode external terminal 54 are stacked with the plated layer 58 interposed therebetween. Furthermore, the negative electrode internal terminal 52 and the negative electrode external terminal 54 are joined to each other via the plated layer 58. A rough surface having a plurality of recessed portions 54b is formed on a surface of the negative electrode external terminal 54 (the upper surface 54a of the negative electrode external terminal 54) which is in contact with the plated layer 58. In the present embodiment, since anodization is performed on the upper surface 54a of the negative electrode external terminal 54 which is made of aluminum, an alumite layer 54c which is an anodized film is formed on the upper surface 54a. Micropores with a pore diameter of 1 nm to 100 nm (preferably, 10 nm to 100 nm) are formed as the recessed portions 54b on a surface of the alumite layer 54c. In the sealed battery 10 according to the present embodiment, a part of the plated layer 58 penetrates into the recessed portions 54b (the micropores) formed on the alumite layer 54c.

In the sealed battery 10 according to the present embodiment, a joining technique utilizing the plated layer 58 described above is applied to the connection between the negative electrode internal terminal 52 and the negative electrode external terminal 54 for heterometal interjunction. Accordingly, a connecting portion having superior strength and low electrical resistance can be formed without being affected by a difference between respective metal materials of the negative electrode internal terminal 52 and the negative electrode external terminal 54.

Specifically, in the present embodiment, the plurality of recessed portions 54b are formed on the upper surface 54a of the negative electrode external terminal 54 and the plated layer 58 penetrates into the plurality of recessed portions 54b. Accordingly, an anchor effect is exhibited at an interface between the negative electrode external terminal 54 and the plated layer 58 and the negative electrode external terminal 54 and the plated layer 58 are mechanically joined. As a result, a robust junction can be realized without being affected by a difference between respective materials of the plated layer 58 and the negative electrode external terminal 54. On the other hand, since metal materials (copper (Cu)) of a same type are joined at an interface between the lower surface 52a1 of the negative electrode internal terminal 52 and an upper surface 58a of the plated layer 58, a possibility of occurrence of connection failure is low. Therefore, according to the present embodiment, the negative electrode internal terminal 52 and the negative electrode external terminal 54 can be robustly connected to each other without being affected by a difference between respective metal materials. In addition, in the sealed battery 10 according to the present embodiment, since the negative electrode internal terminal 52 and the negative electrode external terminal 54 are connected to each other via the plated layer 58 with superior conductivity, a connecting portion with low electrical resistance is formed. As described above, in the sealed battery 10 according to the present embodiment, since a connecting portion with high strength and low resistance is formed between the negative electrode internal terminal 52 and the negative electrode external terminal 54, endurance and battery performance of the sealed battery 10 are improved.

2. Manufacturing Method of Sealed Battery

Next, a method of manufacturing the sealed battery according to the present embodiment will be described. The method of manufacturing a sealed battery includes a rough surface forming step and a plating-joining step.

(1) Rough Surface Forming Step

In the rough surface forming step according to the present embodiment, the alumite layer 54c in which a plurality of micropores are formed as the recessed portions 54b is formed on the surface of the negative electrode external terminal 54. Anodization is used for the formation of the alumite layer 54c. Generally used procedures can be adopted without any particular limitations for the anodization. For example, prior to assembling the negative electrode external terminal 54 to the battery case 30, a surface to be the upper surface 54a of the negative electrode external terminal 54 is immersed in an electrolyte solution (for example, a 0.3 M phosphoric acid aqueous solution ($H_3PO_4$)). Subsequently, in a state where the negative electrode external terminal 54 is used as a positive electrode and a terminal made of stainless steel (such as SUS316) is used as a negative electrode, energization (voltage: 10 V to 50 V, energization time: 30 to 60 minutes) is performed while stirring the electrolyte solution. As a result, the alumite layer 54c having a plurality of micropores is formed on a surface to be the upper surface 54a of the negative electrode external terminal 54.

(2) Plating-Joining Step

In the plating-joining step according to the present embodiment, first, the negative electrode internal terminal 52 and the negative electrode external terminal 54 are assembled to the lid 34 of the battery case 30 so that the upper surface 54a of the negative electrode external terminal 54 and the lower surface 52a1 of the upper end 52a of the negative electrode internal terminal 52 oppose each other. Specifically, as shown in FIG. 2, the insulated holder 56 and the negative electrode external terminal 54 are arranged on an upper surface of the lid 34 so that the terminal insertion hole 34a of the lid 34, the terminal insertion hole 56d of the insulated holder 56, and the terminal insertion hole 54d of the negative electrode external terminal 54 overlap with each other (refer to FIG. 2). At this point, the negative electrode external terminal 54 is arranged so that the alumite layer 54c formed in the rough surface forming step becomes the upper surface 54a. In addition, the upper end 52a of the negative electrode internal terminal 52 is inserted through the terminal insertion holes of the respective members described above and, after exposing the upper end 52a to the outside of the battery case 30, the upper end 52a is pressed and deformed in a disk shape. Accordingly, as shown in FIG. 3, the lower surface 52a1 of the upper end 52a of the negative electrode internal terminal 52 and the upper surface 54a of the negative electrode external terminal 54 oppose each other while having a prescribed gap (clearance). From the perspective of forming a preferable plated layer, a clearance of 0.01 mm or more and 1 mm or less (for example, around 0.1 mm) is preferably secured between the negative electrode internal terminal 52 and the negative electrode external terminal 54.

Next, the plated layer 58 is formed in the gap between the negative electrode internal terminal 52 and the negative electrode external terminal 54. Generally used procedures can be adopted without any particular limitations as means for forming the plated layer 58. For example, a plating solution is poured into the gap between the upper end 52a of the negative electrode internal terminal 52 and the negative electrode external terminal 54 which oppose each other, and energization is performed with the negative electrode internal terminal 52 as a positive electrode and the negative electrode external terminal 54 as a negative electrode. Accordingly, the plated layer 58 with copper (Cu) as a main component is formed between the upper end 52a of the negative electrode internal terminal 52 and the negative electrode external terminal 54. Plating solutions with a general composition can be used without any particular limitations as the plating solution. Examples of the plating solution include a plating solution containing copper sulfate, sulfuric acid, sodium chloride, and polyethylene glycol at a prescribed ratio.

Figure 4:
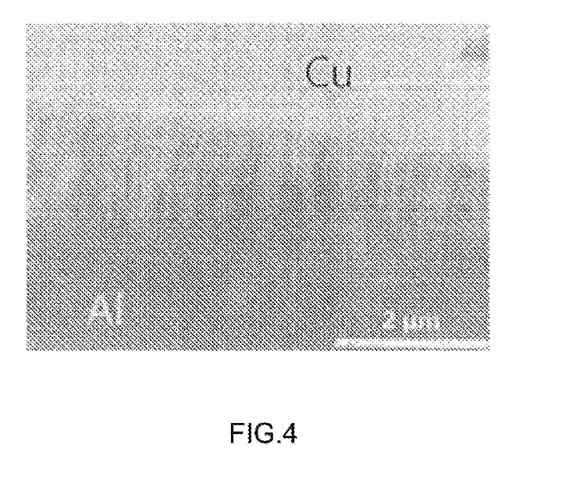
FIG. 4 is a sectional SEM photograph capturing a boundary portion between a negative electrode external terminal and a plated layer.

FIG. 4 shows an SEM photograph of a boundary between the plated layer 58 formed according to the procedure described above and the negative electrode external terminal 54. As shown in FIG. 4, in a sealed battery manufactured by the manufacturing method according to the present embodiment, a part of the plated layer made of Cu penetrates into recessed portions of the negative electrode external terminal made of Al. Accordingly, since a preferable anchor effect is exhibited at a boundary between the negative electrode external terminal and the plated layer, a connecting portion having high strength can be formed between the negative electrode internal terminal and the negative electrode external terminal without being affected by a difference in metal materials of the negative electrode external terminal 54 and the plated layer 58. In addition, since the plated layer 58 made of Cu and the negative electrode internal terminal 52 made of Cu are constituted by metal materials of a same type, a junction failure is less likely to occur.

Furthermore, with the manufacturing method according to the present embodiment, the negative electrode internal terminal and the negative electrode external terminal can be joined to each other at a significantly lower temperature than welding. Therefore, thermal deformation and degradation of parts (the negative electrode internal terminal, the negative electrode external terminal, the insulated holder, and the like) constituting the negative electrode terminal can also be prevented.

3. Sealed Battery According to Another Embodiment

A sealed battery according to an embodiment of the present disclosure has been described above. It should be noted that the embodiment described above is not intended to limit the present disclosure and various configurations may be modified in an appropriate manner.

(1) Formation of Recessed Portions

In the embodiment described above, a rough surface having a plurality of recessed portions 54b is formed on the upper surface 54a of the negative electrode external terminal 54. However, the rough surface having a plurality of recessed portions need only be formed on at least one of an external terminal and an internal terminal and is not limited to the embodiment described above. In other words, the sealed battery disclosed herein contains an aspect in which the rough surface is formed on the side of the internal terminal and an aspect in which the rough surface is formed on both the external terminal and the internal terminal. In particular, an aspect in which the rough surface is formed on both the external terminal and the internal terminal enables a more preferable anchor effect to be exhibited and makes the connecting portion between the external terminal and the internal terminal more robust.

In addition, in the embodiment described above, anodization is performed in order to form the rough surface having a plurality of the recessed portions 54b. However, means for forming the plurality of recessed portions is not particularly limited and various means can be adopted without any particular limitations within a range in which effects of the present disclosure can be appropriately exhibited. For example, a groove-shaped recessed portion may be formed in plurality on a surface of a connection object by laser machining, cutting, or the like. Even when forming a rough surface having such groove-shaped recessed portions, a sufficient anchor effect can be generated by causing a part of the plated layer to penetrate into the recessed portions. However, from the perspective of generating a more preferable anchor effect and more robustly connecting metal members that are connection objects, it is better to form an alumite layer having a plurality of micropores on a surface of a connection object using anodization as in the embodiment described above.

(2) Connection Object

In the embodiment described above, the plated layer 58 is formed between the negative electrode internal terminal 52 and the negative electrode external terminal 54 and the negative electrode internal terminal 52 and the negative electrode external terminal 54 are joined to each other via the plated layer 58. However, the joining technique disclosed herein can be applied to a connecting portion between the internal terminal and the external terminal of at least one of the positive electrode side and the negative electrode side and is not limited to the embodiment described above. In other words, when performing heterometal interjunction between the positive electrode internal terminal and the positive electrode external terminal, the positive electrode internal terminal and the positive electrode external terminal can be joined to each other via a plated layer.

(3) Materials of Members Constituting Connecting Portion

In the embodiment described above, heterometal interjunction which connects the negative electrode internal terminal 52 made of Cu and the negative electrode external terminal 54 made of Al to each other, joining via a plated layer made of Cu is applied. However, the joining technique disclosed herein is applicable as long as the internal terminal and the external terminal are constituted by different metal materials. In other words, materials of metal members (the positive electrode internal terminal, the positive electrode external terminal, the negative electrode internal terminal, and the negative electrode external terminal) which may be used as connection objects are not limited to the embodiment described above. As the electrode terminals to be used as connection objects, metal materials that may be used in electrode terminals of a general sealed battery can be used without any particular limitations within a range in which effects of the present disclosure can be appropriately exhibited.

In addition, although copper (Cu) is used as the material of the plated layer in the embodiment described above, materials that may be used in a general plated layer can be similarly used without any particular limitations. Preferable examples of the material of the plated layer include Ag, Au, Zn, Ni, Cu, Pt, and alloys including these metal elements. A plated layer formed by these metal materials is preferable by virtue of high strength and superior conductivity.

Assembled Battery

1. Structure of Assembled Battery

Figure 5:
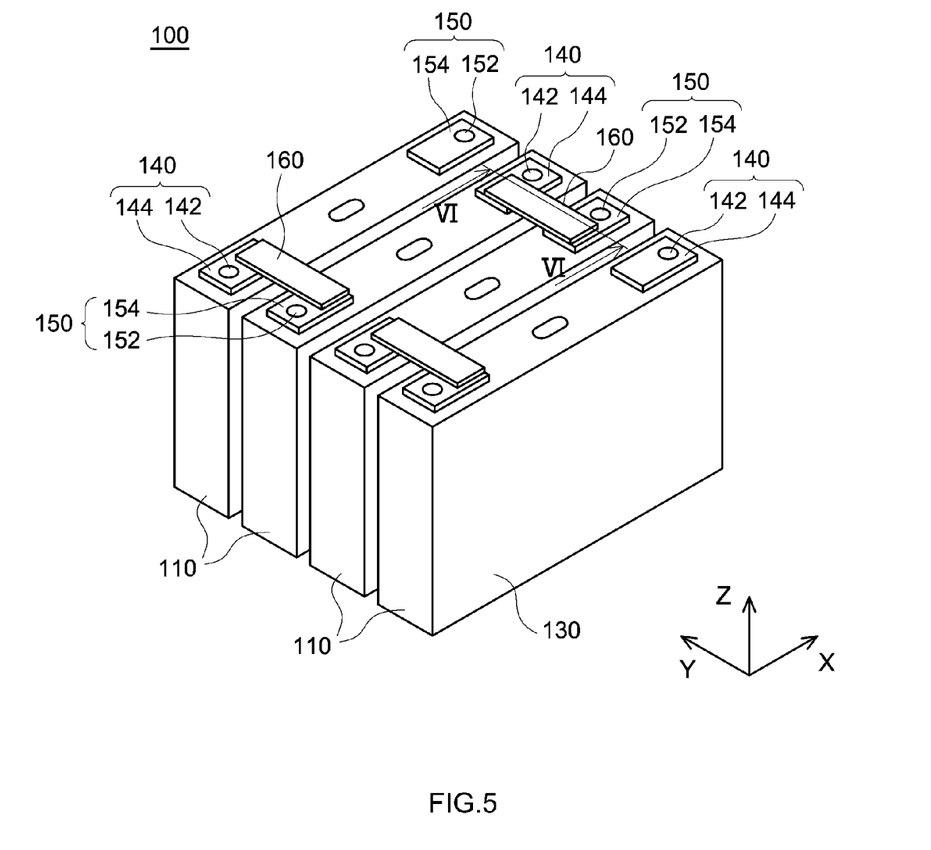
FIG. 5 is a perspective view schematically showing an assembled battery according to an embodiment of the present disclosure.
Figure 6:
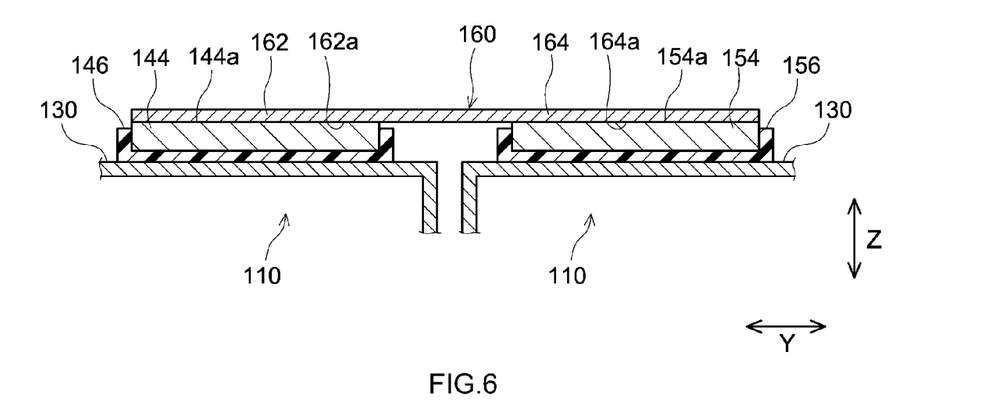
FIG. 6 is a diagram schematically showing a cross-section taken along line VI-VI in FIG. 5.
Figure 7:
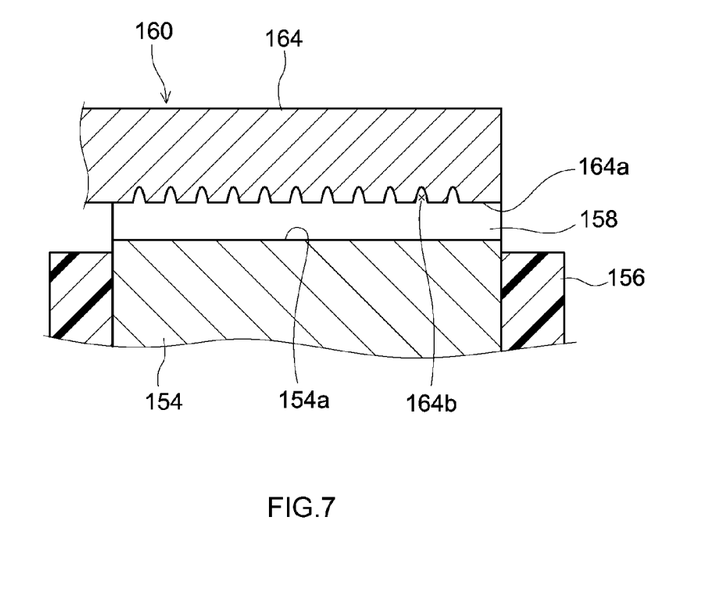
FIG. 7 is a sectional view showing an enlargement of a connecting portion between a busbar and an external terminal shown in FIG. 6.

The joining technique disclosed herein may be applied not only to the sealed battery described above but also to construction of an assembled battery including a plurality of unit cells. Next, an embodiment of the assembled battery disclosed herein will be described. FIG. 5 is a perspective view schematically showing an assembled battery according to the present embodiment. FIG. 6 is a diagram schematically showing a cross-section taken along line VI-VI in FIG. 5. FIG. 7 is a sectional view showing an enlargement of a connecting portion between a busbar and an external terminal shown in FIG. 6.

(1) Unit Cell

As shown in FIG. 5, an assembled battery 100 according to the present embodiment includes a plurality of (in FIG. 5, four) unit cells 110. A sealed battery with a general structure can be used without any particular limitations as each unit cell 110. In other words, the unit cell 110 according to the present embodiment includes an electrode body (not illustrated) having a positive electrode and a negative electrode and a battery case 130 which houses the electrode body. A positive electrode-side electrode terminal (a positive electrode terminal 140) and a negative electrode-side electrode terminal (a negative electrode terminal 150) are attached to the battery case 130.

The positive electrode terminal 140 includes a positive electrode internal terminal 142 and a positive electrode external terminal 144. The positive electrode internal terminal 142 is connected to a positive electrode of the electrode body inside the battery case 130, and a part of the positive electrode internal terminal 142 is exposed to the outside of the battery case 130. The positive electrode external terminal 144 is connected outside the battery case 130 to the positive electrode internal terminal 142. In a similar manner, the negative electrode terminal 150 includes a negative electrode internal terminal 152 and a negative electrode external terminal 154. The negative electrode internal terminal 152 is connected to a negative electrode of the electrode body inside the battery case 130, and a part of the negative electrode internal terminal 152 is exposed to the outside of the battery case 130. The negative electrode external terminal 154 is connected outside the battery case 130 to the negative electrode internal terminal 152. In addition, as shown in FIG. 6, insulated holders 146 and 156 are arranged between the battery case 130 and the external terminals 144 and 154.

In the assembled battery 100 according to the present embodiment, the positive electrode internal terminal 142 and the positive electrode external terminal 144 are constituted by metal materials of a same type (for example, aluminum). In addition, the negative electrode internal terminal 152 and the negative electrode external terminal 154 are also constituted by metal materials of a same type (for example, copper).

(2) Busbar

The assembled battery 100 according to the present embodiment includes, between two unit cells 110 arranged adjacent to each other, a busbar 160 which connects the positive electrode external terminal 144 of one unit cell 110 and the negative electrode external terminal 154 of the other unit cell 110 to each other. Specifically, in the assembled battery 100 according to the present embodiment, respective unit cells 110 are arranged by alternating orientations thereof so that the positive electrode terminal 140 of one unit cell 110 and the negative electrode terminal 150 of the other unit cell 110 come close to each other between two adjacent unit cells 110. In addition, between the adjacent unit cells 110, the positive electrode external terminal 144 of one unit cell 110 and the negative electrode external terminal 154 of the other unit cell 110 are connected to each other by the busbar 160. Accordingly, a conductive path from the positive electrode internal terminal 142 of one unit cell 110 to the negative electrode internal terminal 152 of the other unit cell 110 is formed via the busbar 160 and the external terminals and the respective unit cells 110 are electrically connected in series.

Next, the connecting portion described above between the external terminal and the busbar 160 will now be described in specific terms. As shown in FIG. 6, the busbar 160 is a plate-shaped metal member that extends in an arrangement direction (the thickness direction Y) of the unit cells 110. In the present embodiment, a lower surface 162a of one end 162 of the busbar 160 is connected to an upper surface 144a of the positive electrode external terminal 144 of one unit cell 110. In addition, a lower surface 164a of another end 164 of the busbar 160 is connected to an upper surface 154a of the negative electrode external terminal 154 of another unit cell 110. Furthermore, the busbar 160 made of Al is used in the present embodiment. Therefore, heterometal interjunction is performed at a joining portion between the busbar 160 made of Al and the negative electrode external terminal 154 made of Cu. In the assembled battery 100 according to the present embodiment, a plated layer is formed in a connecting portion between the other end 164 of the busbar 160 and the negative electrode external terminal 154. In other words, in the present embodiment, as shown in FIG. 7, the end 164 of the busbar 160 and the negative electrode external terminal 154 are stacked with a plated layer 158 interposed therebetween. In addition, a rough surface having a plurality of recessed portions 164b is formed on the lower surface 164a of the end 164 of the busbar 160, and a part of the plated layer 158 penetrates into the plurality of recessed portions 164b. Since the other end 164 of the busbar 160 and the negative electrode external terminal 154 are joined to each other via the plated layer 158 in this manner, a connecting portion having high strength and low resistance can be formed without being affected by a difference between metal materials of the busbar 160 and the negative electrode external terminal 154.

2. Manufacturing Method of Assembled Battery

Next, a method of manufacturing the assembled battery according to the present embodiment will be described. The method of manufacturing an assembled battery includes a rough surface forming step and a plating-joining step in a similar manner to the method of manufacturing a sealed battery described above.

(1) Rough Surface Forming Step

In the rough surface forming step according to the present embodiment, a rough surface having a plurality of recessed portions 164b is formed on a surface (the lower surface 164a of the end 164) of the busbar 160. Anodization, laser cutting, cutting, and the like can be used to form the rough surface. For example, when performing anodization, a surface to become the lower surface 164a of the end 164 of the busbar 160 is immersed in an electrolyte solution prior to arranging the busbar 160 on the negative electrode external terminal 154. Subsequently, in a state where the busbar 160 made of Al is used as a positive electrode and a terminal made of stainless steel (such as SUS316) is used as a negative electrode, energization is performed while stirring the electrolyte solution. Accordingly, an alumite layer having a plurality of micropores is formed on the lower surface 164a of the end 164 of the busbar 160.

(2) Plating-Joining Step

In the plating-joining step according to the present embodiment, first, the lower surface 164a of the end 164 of the busbar 160 and the upper surface 154a of the negative electrode external terminal 154 are arranged so as to oppose each other. At this point, a gap of 0.01 mm or more and 1 mm or less (for example, 0.1 mm) is preferably secured between the busbar 160 and the negative electrode external terminal 154. In addition, in the present step, the plated layer 158 is formed in the gap between the busbar 160 and the negative electrode external terminal 154. Generally used procedures can be adopted without any particular limitations as means for forming the plated layer 158 in a similar manner to the formation of the plated layer in the sealed battery described above. For example, the plated layer 158 is formed by pouring a plating solution into the gap between the busbar 160 and the negative electrode external terminal 154 which oppose each other and subsequently performing energization with the negative electrode external terminal 154 as a positive electrode and the busbar 160 as a negative electrode.

3. Assembled Battery According to Other Embodiments

While the assembled battery according to an embodiment of the present disclosure has been described above, the assembled battery described above is not intended to limit the present disclosure and various configurations can be modified.

(1) Connection Object

In the embodiment described above, the plated layer 158 is formed in a connecting portion between the busbar 160 and the negative electrode external terminal 154. However, the joining technique disclosed herein can be applied not only to the connecting portion between the busbar and the negative electrode external terminal described above but also to heterometal interjunction which are present in an assembled battery without any particular limitations. Specifically, in an assembled battery with a general structure, a conductive path from an internal terminal of one unit cell to an internal terminal of another unit cell is formed via a busbar and external terminals. The joining technique disclosed herein can be applied to heterometal interjunction which are present on the conductive path between the unit cells without any particular limitations. Examples of connecting portions on the conductive path between unit cells include a "connecting portion between the positive electrode internal terminal and the positive electrode external terminal", a "connecting portion between the positive electrode external terminal and the busbar", a "connecting portion between the busbar and the negative electrode external terminal", and a "connecting portion between the negative electrode external terminal and the negative electrode internal terminal". When heterometal interjunction is performed at any of the connecting portions between these metal members, joining via a plated layer can be performed in the connecting portion. Accordingly, a connecting portion with high strength and low resistance can be formed without being affected by a difference between metal materials of the connection object. In addition, when a conductive member (a fourth conductive member) made of metal other than a busbar, an internal terminal, and an external terminal is arranged on the conductive path between unit cells, joining via a plated layer can be applied to a connecting portion with the fourth conductive member.

Furthermore, the assembled battery 100 according to the embodiment described above is a serial connection-assembled battery in which a plurality of the unit cells 110 are electrically connected in series. However, the assembled battery disclosed herein is not limited to a serial connection-assembled battery and may be a parallel connection-assembled battery in which a plurality of unit cells are connected in parallel. Specifically, the joining technique disclosed herein can be applied not only to a connecting portion on a conductive path which connects a positive electrode terminal and a negative electrode terminal to each other via a busbar but also to a connecting portion on a conductive path which connects two positive electrode terminals via a busbar and to a connecting portion on a conductive path which connects two negative electrode terminals via a busbar.

(2) Formation of Recessed Portions

In addition, in a similar manner to the case of the sealed battery described above, the rough surface having a plurality of recessed portions need only be formed on a surface of at least one of two metal members that are connection objects and is not limited to the lower surface 164a of the end 164 of the busbar 160 according to the embodiment described above. For example, in a connecting portion between the negative electrode external terminal and the busbar, a rough surface having a plurality of recessed portions may be formed on surfaces of an upper surface of the negative electrode external terminal and a lower surface of an end of the busbar. Accordingly, an anchor effect can be preferably generated and the negative electrode external terminal and the busbar can be more robustly connected to each other.

(3) Materials of Members Constituting Connecting Portion

In the embodiment described above, a junction via a plated layer is used to join the negative electrode external terminal 154 made of Cu and the busbar 160 made of Al. However, as described above, the joining technique disclosed herein is applicable as long as the junction object is constituted by different metal materials. Therefore, a material of the metal members present on the conductive path is not particular limited.

In a similar manner to the plated layer formed in the sealed battery described above, the plated layer according to the present embodiment is preferably constituted by Ag, Au, Zn, Ni, Cu, Pt, and alloys including these metal elements. Accordingly, a plated layer with high strength and superior conductivity can be formed.

While specific examples of the present disclosure have been described in detail, such specific examples are merely illustrative and are not intended to limit the scope of claims. Techniques described in the scope of claims include various modifications and changes made to the specific examples illustrated above.

What is claimed is:

1. A method of manufacturing a sealed battery that includes:
    an electrode body having a positive electrode and a negative electrode;
    a battery case housing the electrode body;
    a positive electrode-side internal terminal which is connected inside the battery case to the positive electrode and of which a part is exposed to outside of the battery case;
    a positive electrode-side external terminal which is connected outside the battery case to the positive electrode-side internal terminal;
    a negative electrode-side internal terminal which is connected inside the battery case to the negative electrode and of which a part is exposed to outside of the battery case; and
    a negative electrode-side external terminal which is connected outside the battery case to the negative electrode-side internal terminal,
    the internal terminal and the external terminal of at least one of the positive electrode side and the negative electrode side being constituted by metal materials that differ from each other,
    the method comprising the steps of:
    forming a terminal insertion hole in a lid of a battery case of the sealed battery;
    forming a terminal insertion hole in the negative electrode-side external terminal;
    inserting an upper end of the negative electrode-side internal terminal into the terminal holes so the upper end is exposed to an outside of the battery case;
    deforming the upper end of the negative electrode-side internal terminal to fix the negative electrode-side internal terminal and the negative electrode-side external terminal to the lid; and
    connecting the internal terminal and the external terminal to each other, wherein
    the step of connecting the internal terminal and the external terminal includes:
    a rough surface forming step of forming a rough surface having a plurality of recessed portions on at least one of a surface of the internal terminal and a surface of the external terminal;
    a plating-joining step of arranging the internal terminal and the external terminal so that the rough surface faces another connection object with a gap between the rough surface and the connection object, forming a plated layer between the internal terminal and the external terminal, and joining the internal terminal and the external terminal to each other by causing a part of the plated layer to penetrate into the recessed portions; and
    in the rough surface forming step, by performing anodization on a surface of a negative electrode-side external terminal constituted by a metal material of which a main component is Al, an alumite layer having a plurality of micropores is formed on the surface of the external terminal.

2. The method of claim 1, wherein the deforming step comprises pressing the upper end into a disk shape.

3. The method of claim 1, further comprising forming a terminal through hole in an insulated holder, and arranging the terminal hole of the lid, the terminal hole of the insulated holder and the terminal hole of the negative electrode-side external terminal so the terminal holes overlap with each other.

* * * * *